Dec. 11, 1956  E. G. MARTIN  2,773,436
PHOTOGRAPHIC FILM IDENTIFICATION
Filed Feb. 24, 1954  2 Sheets-Sheet 1

*INVENTOR.*
EDWARD G. MARTIN
BY
ATTORNEYS

Dec. 11, 1956  E. G. MARTIN  2,773,436
PHOTOGRAPHIC FILM IDENTIFICATION
Filed Feb. 24, 1954  2 Sheets-Sheet 2

INVENTOR.
EDWARD G. MARTIN
BY Kenway Jenney
Witter & Hildreth
ATTORNEYS

United States Patent Office 2,773,436
Patented Dec. 11, 1956

2,773,436

PHOTOGRAPHIC FILM IDENTIFICATION

Edward G. Martin, Cambridge, Mass.

Application February 24, 1954, Serial No. 412,261

3 Claims. (Cl. 95—1.1)

The present invention relates to photographic apparatus and more particularly to apparatus for marking or identifying photographically sensitive material by means of radiation emitting materials.

Previous devices have usually made use of means for stamping the films with ink or marking a paper attached to the film. Such methods are inconvenient for developing the film, causing impurities in the solutions, or loss of the markings during agitation. Other devices use strips to be photographed at the same time as the primary subject. These can be inconvenient as where the subject is at infinity and the strip cannot be held in focus (as in reconnaissance photography) or where the primary subject is too dark to shed light on the information strip (as in oscillographic photography). Devices to surmount these obstacles have made use of auxiliary lenses or lights or separate photographing operations, but such devices are often cumbersome or expensive.

It is therefore one object of the present invention to provide a film-marking device that marks the film as part of the latent image, the marking being made visible during development.

It is a further object to provide a film-marking device that marks the film without the use of auxiliary lenses or lights.

In furtherance of these and other objects, a principal feature of the present invention is the use of radioactive or luminous material as a marking agent for the film. It is a further feature to provide several members each carrying several characters and means to select one character from each member to be marked on the film, where the film may be marked with any one of a large number of combinations of characters. It is still another feature of the present invention to make use of a mechanical configuration such that the film may be marked quickly with a single motion once the data to be marked have been set.

These and other features will appear from the accompanying drawings in which.

Figures 1, 2:
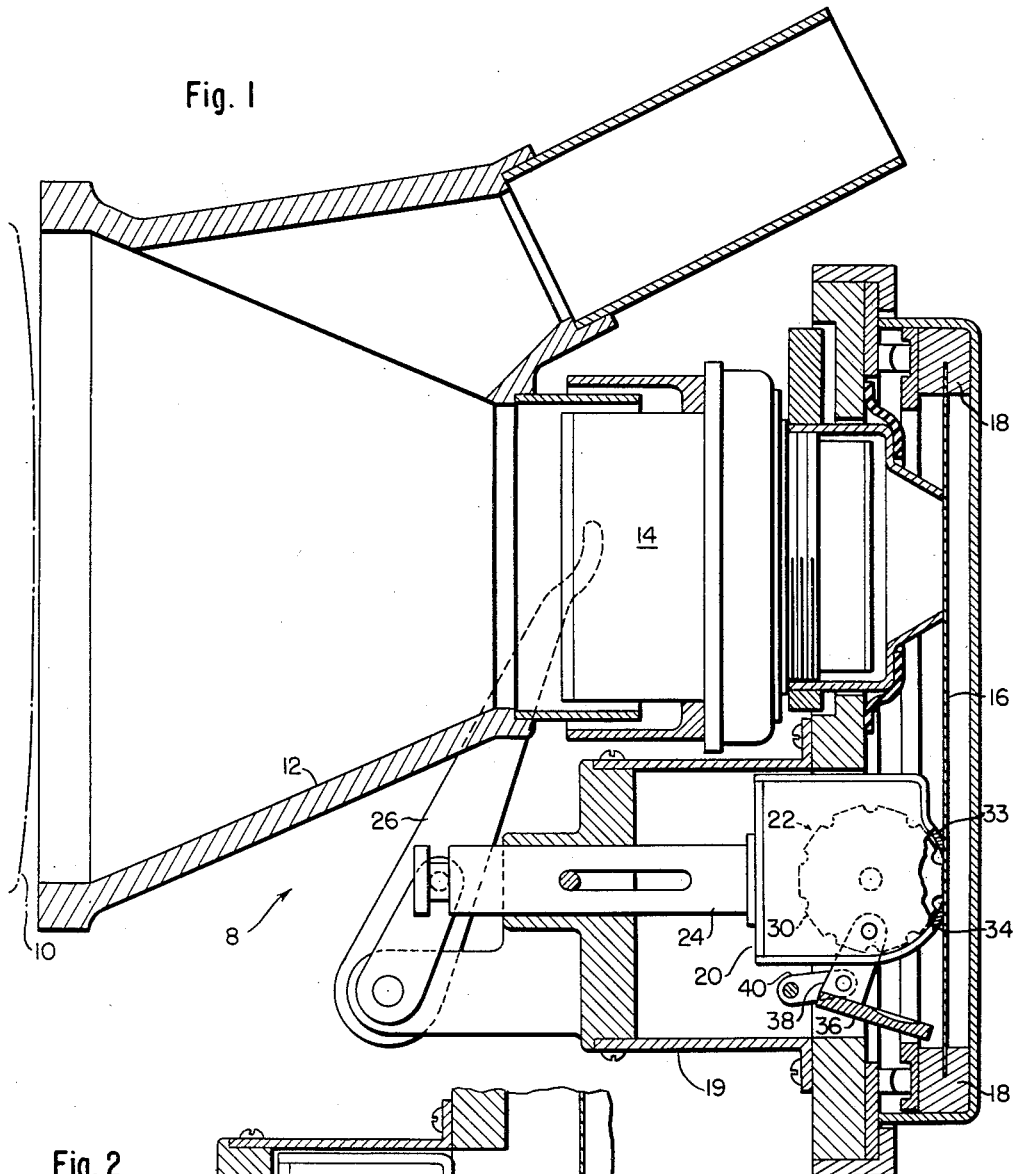
Fig. 1 shows the device as it attaches to a camera.
Figs. 2 and 3 are detail drawings showing the mechanical configuration.

The apparatus shown in the drawings comprises a camera indicated generally at 8 which is adapted to make a photographic record of an oscillogram displayed on a screen which is indicated diagrammatically at 10 at the left side of Fig. 1. The camera comprises a hood 12 and an optical system indicated generally at 14. A sensitive film 16 is supported in any suitable manner, as indicated by the film holder 18, to have a portion thereof exposed to the desired subject to be photographed.

It will be understood that the application to an oscilloscope is illustrative only and the camera may be of a type for photographing other subjects, as in aerial photography or any other purpose.

Forming part of the body of the camera is a marking unit having a portion opposed to the film 16. The marking unit comprises a light-tight cylinder 19 within which is mounted a sliding casing 20 carrying within it the identification device 22.

Preferably the casing 20 is mounted on a link 24 which can be reciprocated by a manually operated handle 26. The casing 20 is normally in the position shown in Fig. 2 when the device is in inoperative position, but may be moved into the active position in proximity to the film shown in Fig. 1 for exposing the film with the identification markings. A spring 28 within the link 24 serves to urge the parts to inactive position.

Figure 4:
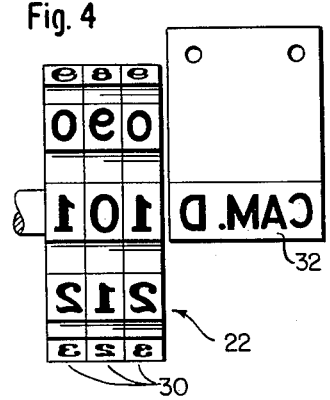
Fig. 4 is an elevation of the character-bearing wheels.

The marking unit 22 may be of any suitable form, carrying any desired marking characters as will hereinafter be described. As will be described presently, the characters are of radiation-generating, preferably radioactive, material. The usual marking system involves consecutive numbering and to that end the device preferably includes consecutive numbering wheels 30 associated with any desired fixed code plate 32 as shown in Fig. 4. The wheels 30 may be provided with any suitable and well-known mechanism (not shown) for consecutively advancing the wheels, if desired, or they may be advanced manually when the film is changed.

Figure 3:
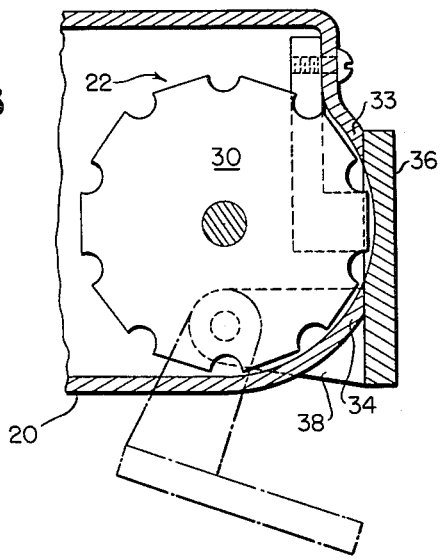

The casing 20 is in the form of an enclosure and is of a material to shield against the passage of rays or radioactive particles. An aluminum casing is usually satisfactory. As shown in Fig. 3, the enclosure is formed with lips 33 and 34 which are concentric with the wheels 30. The edges of the wheels 30 and the code plate 32 are adapted to be exposed in the opening between the lips 33 and 34 when the device is in active film-marking position.

When the device is in retracted position, as shown in Fig. 2, the gap is closed by a cover shield 36, also preferably of aluminum or other material opaque to the radioactive rays and particles. The cover shield 36 is provided with a link 38 pivoted on the casing 20, and the link 38 is connected with a link 40 which in turn is pivoted on a fixed part of the outer cylinder 19.

It will be observed that upon a motion of the casing 20 from its inactive position of Fig. 2 to its active position of Fig. 1, the cover shield 36 swings outwardly in a manner similar to the swinging motion of the ink pad of a conventional numbering machine, thereby exposing the code plate 32 and the number wheels 30 to the film.

Figure 5:
Figs. 5 and 6 are sectional detail views through one of the engraved lines on the character-bearing wheels.
Figure 6:

The radioactive material may be applied by coating the characters of a standard numbering machine. Preferably, the wheels are engraved or etched as shown in Figs. 5 and 6, and the desired radioactive material is deposited therein. If desired, the radioactive material may be in the form of a plaque covered by marks suitably stenciled or perforated in the shape of the characters. It will be understood that, as shown in Fig. 1, the radioactive material does not necessarily come in contact with the film but may be spaced slightly therefrom and therefore there is no danger of its being rubbed off or mutilated.

It will be understood that any desired radiation-generating material may be used. Thus, the ordinary luminous radium paint such as is used for coating watch dials may be used, and this has the advantage of giving a visual indication which can be seen in the dark. Any suitable artificially radioactive materials of long half-life may also be used and are preferred because of their high actinic value. Luminous and fluorescent materials may also be used although they usually require preactivation, as by exposure to ultra-violet light.

Figure 7:
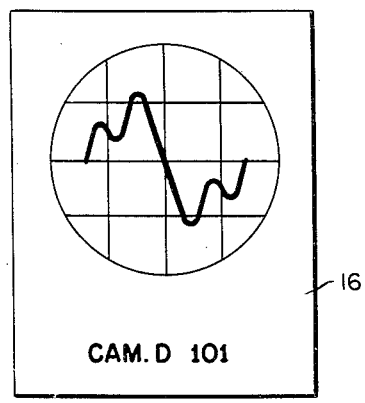
Fig. 7 shows a piece of developed film as marked by the embodiment shown.

It has been found that the shielding effected by the casing 20 and the cover shield 36 is sufficient to prevent fogging of the sensitized film 16 even when the latter is carried in the camera for an extended time. Upon operation of the device to present the wheel into proximity to the film, as shown in Fig. 1, sufficient activation is present to affect the sensitized film in a matter of a few seconds. A typical film is shown in Fig. 7, in which there are shown an oscillogram and the marking or identification data. The letters are exposed from the stationary code plate, while the numbers are from the wheels.

The advantages of the invention are that no additional optical equipment is required. No active material is deposited or left on the film. The film requires no special processing since the identification data appear on the film when developed. The latent image is identical to any other photographic latent image. The activity of the radioactive material may be such as to produce an adequate identification marking without damage to the film and without any serious health hazard to users over a long period.

Although the invention has been described as embodied in a camera, it will be understood that it may be used for film identification in other situations; for example, the unit 19 with its enclosed parts may be used in a darkroom as a means of applying identifying data to films either before or after exposure. The shielding protects any stored film from damage, and the device may be used in a manner similar to a dating or numbering stamp for exposing a selected piece of film to the identification exposure, at which time the cover shield opens in the manner shown in Fig. 1 and described above.

Although the term "film" is used for convenience, it will be understood that it includes any photosensitive material, whether on paper, glass plates, or other medium.

Having thus described the invention, I claim:

1. An identification device for film comprising a marking member having one or more characters formed in radioactive material, an enclosure for the marking member to serve as a shield against radiation, the enclosure having an opening through which the marking member may be exposed, a cover shield member for said opening, a support for the enclosure, means for effecting relative movement of the enclosure with respect to the support to bring the marking member into immediate proximity with a film to be marked by direct radiation from the radioactive material on to the film, and means operated by said movement for moving the cover shield away from said opening.

2. The combination with a camera having film supporting and exposing means, of a marking member having one or more characters formed in radioactive material, means for mounting the marking member within the camera in position normally remote from the film in the supporting means, an enclosure for the marking member to protect the film from exposure to the radioactive material while the film is inactively carried in the camera, and means for moving the marking member into immediate proximity to the film for exposure of the film by direct radiation from the characters of the marking member on to the film, said moving means having provision for opening the shielding enclosure to cause the film to be activated by said marking member.

3. The combination with a camera having film supporting and exposing means, of a marking member having one or more characters formed in radioactive material, means for mounting the marking member within the camera in position normally remote from the film in the supporting means, an enclosure for the marking member to protect the film from exposure to the radioactive material, the enclosure having an opening for the marking member, a shield member normally closing said opening, means for moving the enclosure into immediate proximity to the film for exposure of the film by direct radiation from the characters of the marking member on to the film, and connections between said moving means and said shield member to uncover said opening to cause the marking member to activate the film.

References Cited in the file of this patent

UNITED STATES PATENTS

| | | |
|---|---|---|
| 1,358,990 | Scannell | Nov. 16, 1920 |
| 1,375,816 | Bethke | Apr. 26, 1921 |
| 2,036,682 | Cantor | Apr. 7, 1936 |

FOREIGN PATENTS

| | | |
|---|---|---|
| 557,831 | Great Britain | Dec. 7, 1943 |